United States Patent [19]
Damiron

[11] 3,823,796
[45] July 16, 1974

[54] MUFFLERS FOR INTERNAL COMBUSTION ENGINES

[76] Inventor: Paul Damiron, 10 Place des Etats-Unis, 75016 Paris, France

[22] Filed: Aug. 8, 1973

[21] Appl. No.: 386,692

[30] Foreign Application Priority Data
Aug. 17, 1972 France .................... 72.29485

[52] U.S. Cl. ................ 181/49, 181/57, 181/59, 181/64 R
[51] Int. Cl. ............................................ F01n 1/08
[58] Field of Search ......... 181/47 A, 49, 57, 59, 63, 181/64 R, 64 A, 64 B, 65, 69

[56] References Cited
UNITED STATES PATENTS

| | | | |
|---|---|---|---|
| 863,342 | 8/1907 | Alber | 181/57 |
| 2,198,021 | 4/1940 | Wood | 181/59 X |
| 2,419,664 | 4/1947 | Tabbert | 181/64 B UX |
| 3,087,579 | 4/1963 | Katogir | 181/59 X |
| 3,209,857 | 10/1965 | Eckel | 181/57 X |

FOREIGN PATENTS OR APPLICATIONS
1,189,403  3/1959  France .................... 181/64 B Primary Examiner—Richard B. Wilkinson
Assistant Examiner—John F. Gonzales

[57] ABSTRACT

This invention relates to mufflers for internal combustion engines of all kinds.

The invention provides means to break up the plane sound waves formed in the conduit between the engine and the muffler so as to absorb these waves wholly or in part near the point where the gas inlet conduit leads into the muffler. A vibratory diaphragm and a resonant cavity play important parts in arrangements according to the invention.

7 Claims, 3 Drawing Figures

3,823,796

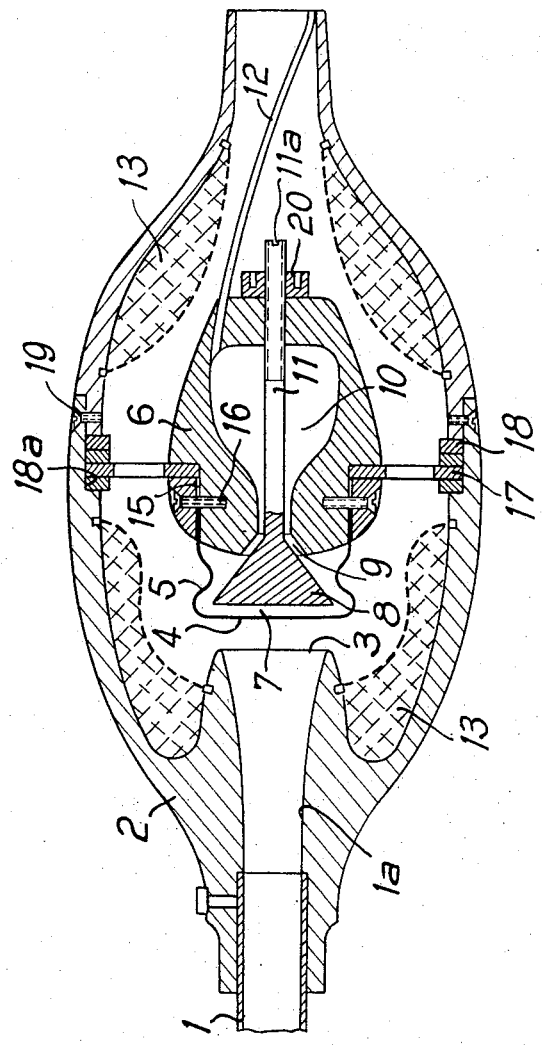

MUFFLERS FOR INTERNAL COMBUSTION ENGINES

FIELD OF THE INVENTION

The exhaust gases from internal combustion engines or the like, such as petrol or diesel automobile engines, marine engines, diesel engines for driving compressors, and engines used in public works, are accompanied by compression and expansion waves in the conduit through which they are discharged from the combustion chamber.

These waves are plane due to the fact that there is no room for transverse resonance to be set up in the conduit for the gases and propagation is therefore in one dimension.

When they arrive at the end of the exhaust pipe, i.e., the pipe which opens to atmosphere, the waves take on a spherical form. They are then propagated in several dimensions and the resulting noise spreads in all directions.

PRIOR ART

In mufflers at present known, the plane waves mentioned above are partially absorbed by an arrangement which is intended to absorb them. Generally such absorption means take the form of baffles which may, for example, be cylindrical apertured tubes or labyrinthine constructions.

SUMMARY OF THE INVENTION

The invention consists in a muffler for an internal combustion engine, said muffler comprising a casing fitted with a gas inlet conduit and a gas outlet conduit, a resonant cavity, an exhaust pipe connecting said resonant cavity to the atmosphere and constituting said gas outlet conduit, a vibratory diaphragm located between said gas inlet conduit and said resonant cavity, and means forming lateral passages surrounding said diaphragm to enable exhaust gas to flow away via said exhaust pipe.

An object of this invention is therefore a muffler for this purpose which shall efficiently absorb the plane waves and substantially reduce the noises produced at the exhaust pipe of conventional mufflers where the exhaust gases are voided to atmosphere.

Other objects and advantages will become apparent by a reading of the following description together with the claims and the accompanying drawings.

DESCRIPTION OF THE DRAWINGS

FIG. 3 is another modification of FIG. 1, constituting a third embodiment.

DESCRIPTION

Figure 1:
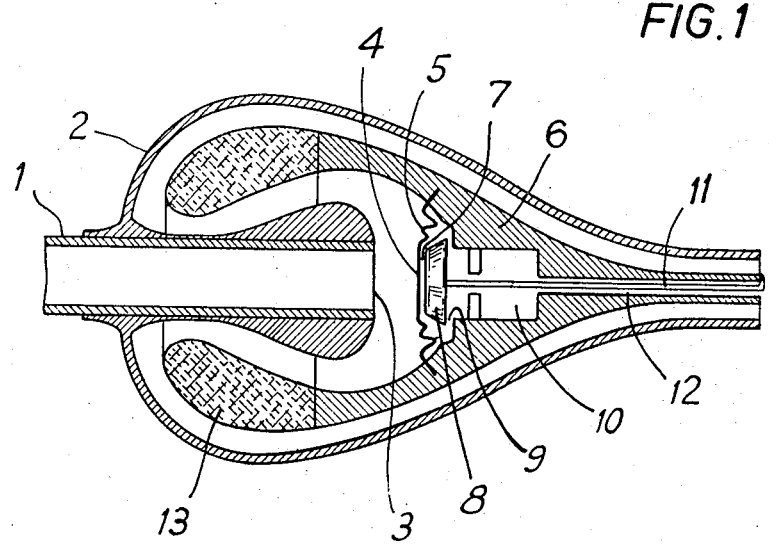
FIG. 1 is an axial section of one embodiment of muffler according to the invention.

Referring first to FIG. 1, the muffler shown therein incorporates a gas inlet conduit 1 intended to be connected to the engine (not shown), and on which conduit is mounted an outer casing 2 which is fitted by being slid along the conduit 1.

The gases from the engine penetrate into the muffler as far as the end 3 of the conduit 1, this end 3 being cut off at right angles to the axis of the conduit, as shown.

At a short distance from the said end 3 of the conduit is situated a circular, metal diaphragm 4 which vibrates in the manner of a flat piston under the action of the waves transmitted in the flow of exhaust gases.

Except in the area of its circular periphery, this diaphragm 4 may either be flat, or slightly contoured in a curved shape to prevent it bending under the impact of the flow of gas.

The circular periphery has associated with it one or more corrugations 5, so as to localise flexion to the region radially beyond the part actually receiving the acoustic wave.

Outside the corrugations, the disc is rigidly held in a fairly massive metal part 6 which forms a block having low resonance.

The material of which the diaphragm 4 is made is of great importance; besides its ability to transmit acoustic energy, it should, in particular, be suited to the gas temperatures and the corrosive action of the gases. Materials so far known to be suitable are aluminium-silicon alloy and aluminium-copper alloy.

The diaphragm should be distinctly resonant and the major portion of the acoustic energy which it receives is transmitted to its rear face.

Behind the rear face of the diaphragm is situated a certain volume of air which forms a first chamber 7 which has a certain acoustic impedance.

Its absorbent effect is increased by the presence in its immediate vicinity of a massive part or piston 8 which has a frictional effect on the air which is subjected to the vibrations of the diaphragm. The surface of the piston may be dulled or even roughened.

Between the piston 8 and the part 6 is left a constrictor gap 9 which communicates with a second chamber 10 situated to the rear of the piston 8, the piston being carried by a stem 11 which slides in the part 6 and enables the position of the piston to be adjusted in order to alter the size of the constrictor gap and thus the absorbent effect.

The second chamber 10 is designed as a Helmholtz resonator and in particular incorporates a communication to atmosphere formed by a pipe 12 which is concentric with the stem 11 carrying the piston 8 and which opens to atmosphere at the outlet from the muffler.

In their very short unimpeded flow between the end 3 and the diaphragm 4, the exhaust gases in the muffler cause residual return waves to be formed. These are transverse, spherical waves whose total energy, although small in relation to that which is converted in the diaphragm and resonator assembly, has nevertheless to be absorbed.

To this end, there is provided a return-flow path for the flow of gases including porous walls 13 containing for example slightly compressed metal fibres which form a resilient means of absorbing the waves when the gases come into contact with them.

The gases are then fed on to the outlet from the muffler, in the exhaust pipe.

Figure 2:
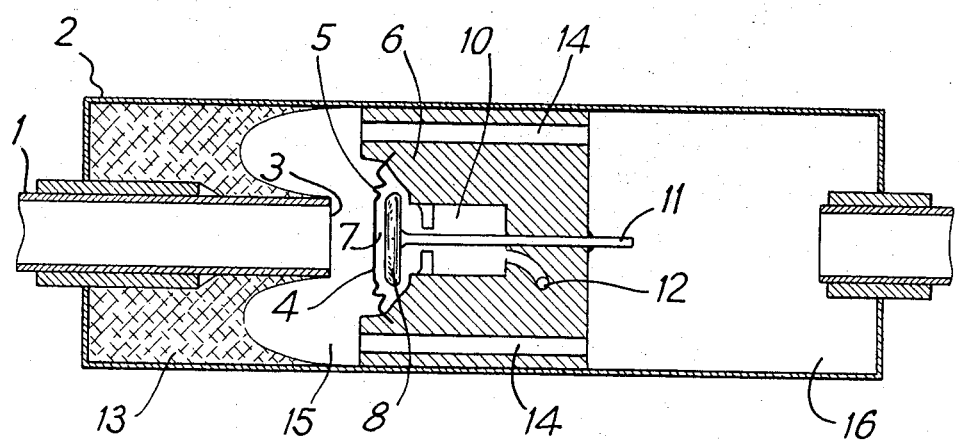
FIG. 2 is a modification of FIG. 1, constituting a second embodiment

FIG. 2 shows an embodiment of muffler in accordance with the invention which enables other muffling or cleaning arrangements to be added to meet the requirements of anti-pollution regulations.

In this embodiment, where parts similar to those in FIG. 1 are given the same reference, the casing 2 is cylindrical, being made of welded sheet-metal for example, and contains a metal casting 6 which slides into the cylindrical casing and incorporates the members for absorbing the waves by converting their energy, that is to say the diaphragm 4, corrugations 5, the adjustable piston 8, and the resonant chamber 10 with the tube 12 for equalising to atmospheric pressure. The gases flow through passages 14 formed through the part 6, which divides the muffler into two chambers 15 and 16.

It is easy in such an assembly to adjust the distance between the end 3 of the tube 1 and the diaphragm 4 by sliding the block 6 in the muffler 2 and then by securing it in the desired position by a spot-weld or screws.

The position of the piston 8 is adjusted by moving the stem 11 backwards or forwards and then by securing it by welding its end to the block 6.

The adjustments detailed above are only required to achieve proper conversion and absorption of the waves when a muffler of the type described is fitted to a certain type of engine for the first time as part of a new design for example. Such adjustments are not required in production samples which can be built into the settings which have been observed under test to be satisfactory.

The chamber 15 has, as in FIG. 1, walls 13 which are in contact with the gases, whereas the chamber 16, which is empty, can hold any conventional noise-absorption device or any device for catalytic conversion which is intended to clean the gases.

The muffler shown in FIG. 3 of the drawing, where again like references therein, to FIGS. 1 and 2 denote like parts, incorporates an inlet conduit 1 for the exhaust gases which extends into a section 1a which diverges towards the end 3, where it faces a vibrating diaphragm 4 whose corrugated periphery 5 is folded back to fit into a slot 15 in the part 6 in the inside of which is arranged the resonant chamber 10. The diaphragm is held in position in the slot by means of clamping screws 16.

The part 6 incorporates a perforated flange 17, the periphery of which is clamped between washers 18 which thus enable the distance between the diaphragm 4 and the end 3 to be adjusted.

The washers 18 are held in a recess 18a formed in the casing 2 of the muffler, this casing being in two parts which fit into one another and are held together by screws 19. This enables the washers to be placed in position, since the recess 18a is situated at the joint between the two parts of the casing.

The piston 8, which defines the chamber 7 and throttles the flow of air in the passage 9 by which the two chambers communicate, can be adjusted by means of its stem 11 the threaded end of which screws into the part 6. A lock-nut 20 holds the stem in position, and the end of the stem is provided with a slot 11a which enables a screw-driver to be used to adjust the axial position of the piston by turning the stem 11.

The inside of the muffler is also provided with porous material 13.

In addition, to prevent too rigid breakdown of the diaphragm, which is not necessarily made of metal, but may be made of any substance having the properties hereinabove it may be useful to cool the gases before they enter the muffler by means of a pipe fitted with fins for example.

The arrangement described is particularly suitable for noise frequencies of from 10 to 400 Hertz produced by engines and is intended to give a substantially flat response curve over this frequency range.

The invention is not limited to the single embodiment shown and described but, on the contrary, covers all modifications thereof which will occur to those skilled in the art and are considered to be within the spirit of the invention as defined by the appended claims.

I claim:

1. A muffler for an internal combustion engine, said muffler comprising a casing fitted with a gas inlet conduit and a gas outlet conduit, a resonant cavity, an exhaust pipe connecting said resonant cavity to the atmosphere and constituting said gas outlet conduit, a vibratory diaphragm located between said gas inlet conduit and said resonant cavity, and means forming lateral passages surrounding said diaphragm to enable exhaust gas to flow away via said exhaust pipe.

2. A muffler according to claim 1, wherein said resonant cavity is divided into two chambers by a piston, said piston having a face which is close to said diaphragm and a constrictor space being provided around said piston to form a communication between said two chambers.

3. A muffler according to claim 2, wherein said muffler casing is divided into two chambers by said diaphragm resonant cavity assembly, said assembly being incorporated in a part which forms a divider means and is provided with lateral passages through which said two chambers communicate, one of said chambers surrounds said inlet conduit and containing a porous absorbent material and the other one of said chambers containing a gas-cleaning means.

4. A muffler according to claim 1 wherein said inlet conduit diverges towards said diaphragm.

5. A muffler according to claim 2 wherein said inlet conduit diverges towards said diaphragm.

6. A muffler according to claim 1, wherein said diaphragm/resonant cavity assembly incorporates a perforated flange which is fixed in the inside of said muffler casing by its periphery, said periphery being clamped between packing and adjusting washers.

7. A silencer according to claim 1, wherein a piston is mounted on a stem which screws into the wall of said resonant cavity and is secured by a lock-nut, said stem and said lock-nut facing said exhaust pipe so as to be accessible through said exhaust pipe.

* * * * *